(12) United States Patent
Tang

(10) Patent No.: US 11,500,420 B2
(45) Date of Patent: Nov. 15, 2022

(54) DISPLAY DEVICES AND DISPLAY SCREEN MODULES

(71) Applicant: Kunshan Go-Visionox Opto-Electronics Co., Ltd., Kunshan (CN)

(72) Inventor: Tao Tang, Kunshan (CN)

(73) Assignee: KUNSHAN GO-VISIONOX OPTO-ELECTRONICS CO., LTD., Kunshan (CN)

(*) Notice: Subject to any disclaimer, the term of this patent is extended or adjusted under 35 U.S.C. 154(b) by 586 days.

(21) Appl. No.: 16/558,344

(22) Filed: Sep. 3, 2019

(65) Prior Publication Data

US 2019/0384360 A1 Dec. 19, 2019

Related U.S. Application Data

(63) Continuation of application No. PCT/CN2018/086891, filed on May 15, 2018.

(30) Foreign Application Priority Data

Sep. 30, 2017 (CN) .......................... 201710940248.X

(51) Int. Cl.
G06F 1/16 (2006.01)
(52) U.S. Cl.
CPC .......... *G06F 1/1637* (2013.01); *G06F 1/1607* (2013.01); *G06F 1/1686* (2013.01)
(58) Field of Classification Search
CPC .... G06F 1/1637; G06F 1/1607; G06F 1/1686; G06F 1/1647; G06F 1/1684; G06F 1/1635; G06F 1/1609
See application file for complete search history.

(56) References Cited

U.S. PATENT DOCUMENTS 5,111,498 A * 5/1992 Guichard ............... H04N 7/142
379/434
10,331,164 B2 6/2019 Bao
(Continued)

FOREIGN PATENT DOCUMENTS

CN 1808222 A 7/2006
CN 201976190 U 9/2011
(Continued)

OTHER PUBLICATIONS

TW Office Action dated Jul. 24, 2019 in the corresponding TW application (application No. 107122463).
(Continued)

*Primary Examiner* — Michael A Faragalla
*Assistant Examiner* — Sujit Shah
(74) *Attorney, Agent, or Firm* — Kilpatrick Townsend & Stockton

(57) ABSTRACT

The disclosure relates to display devices and display screen modules. The display device includes a body, a display screen and a second display area. The display screen is disposed on the body, and the display screen includes a first display area and a light transmitting area. The first display area has a light exiting surface facing away from the body. The second display area is located between the display screen and a bottom surface of the body and configured to compensate for the light transmitting area, so that the light transmitting area displays image information, realizing full-screen display.

17 Claims, 4 Drawing Sheets

(56) References Cited

U.S. PATENT DOCUMENTS

| | | | | |
|---|---|---|---|---|
| 2005/0052558 | A1* | 3/2005 | Yamazaki | G06V 30/142 348/333.12 |
| 2016/0241760 | A1* | 8/2016 | Law | G02B 6/08 |
| 2017/0090518 | A1* | 3/2017 | Fukuma | G06F 3/042 |
| 2017/0219838 | A1* | 8/2017 | Yang | G02B 30/36 |

FOREIGN PATENT DOCUMENTS

| | | |
|---|---|---|
| CN | 203206362 U | 9/2013 |
| CN | 103338282 A | 10/2013 |
| CN | 105446061 A | 3/2016 |
| CN | 106506742 A | 3/2017 |
| CN | 106603772 A | 4/2017 |
| CN | 106713546 A | 5/2017 |
| CN | 106850897 A | 6/2017 |
| CN | 106920470 A | 7/2017 |
| CN | 206389421 U | 8/2017 |
| CN | 107241467 A | 10/2017 |
| CN | 107580092 A | 1/2018 |
| CN | 107682489 A | 2/2018 |
| JP | 2006237914 A | 9/2006 |
| WO | 2018161750 A1 | 9/2018 |

OTHER PUBLICATIONS

International Search Report dated Aug. 1, 2018 in the corresponding International application (application No. PCT/CN2018/086891).
CN First Office Action dated Sep. 10, 2019 in the corresponding CN application (application No. 201710940248.X).

* cited by examiner

DISPLAY DEVICES AND DISPLAY SCREEN MODULES

CROSS-REFERENCES TO RELATED APPLICATIONS

This application is a continue application for International Application No. PCT/CN2018/086891, filed on May 15, 2018, which claims the priority benefit of Chinese Patent Application No. 201710940248. X, titled "DISPLAY DEVICES AND DISPLAY SCREEN MODULES" and filed on Sep. 30, 2017. The entireties of both applications are incorporated by reference herein for all purposes.

TECHNICAL FIELD

The present disclosure relates to display technologies, and in particular, to display devices and display screen modules.

BACKGROUND

In the conventional electronic product, the top of the display screen module is a non-display area, under which a light-receiving module (such as a front camera) is placed, and the external light is collected through an opening in the non-display area. This arrangement causes a large black frame on the screen, and the area corresponding to the camera cannot be used for display, making the realization of full-screen display difficult.

SUMMARY

Based on this, it is necessary to provide a display device for the problem of difficulties in realizing full-screen display by a conventional design. In addition, a display screen module is also provided.

According to an aspect of the present disclosure, there is provided a display device comprising:

a body;

a display screen disposed on the body, and including a first display area and a light transmitting area; and a second display area located between the display screen and a bottom surface of the body and aligned with the light transmitting area, projections of the second display area and the light transmitting area on the display screen overlapping with each other, and the light transmitting area displaying an image information on the second display area.

According to the display device of the above aspect of the present application, the second display area is provided between the display screen and the bottom surface of the body and configured to compensate for the light transmitting area, so that the light transmitting area displays image information, thereby realizing full-screen display.

According to another aspect of the present disclosure, there is provided a display screen module comprising:

a body;

a display screen including a first display area and a light transmitting area;

a second display area located between the display screen and a bottom surface of the body and aligned with the light transmitting area, projections of the second display area and the light transmitting area on the display screen overlapping with each other, and the light transmitting area displaying an image information displayed on the second display area; and a light-receiving module located in a path of a reflected light from the light transmitting area.

According to the display screen module of the above aspect of the present application, the display screen module is provided with the second display area useful for compensating the light transmitting area, so that the light transmitting area displays image information, thereby enabling the display screen to realize full screen display.

DETAILED DESCRIPTION OF THE INVENTION

The specific embodiments of the present disclosure will be described below with reference to the accompanying drawings.

Figure 1:
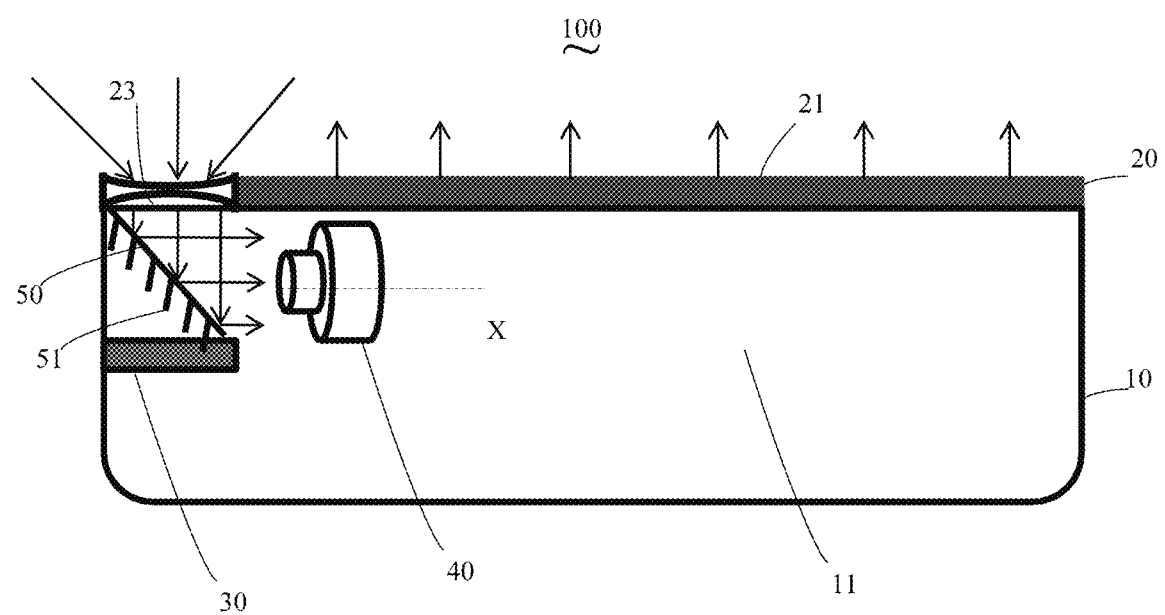
FIG. 1 is a side view of a display device according to an embodiment of the present disclosure.
Figure 2:
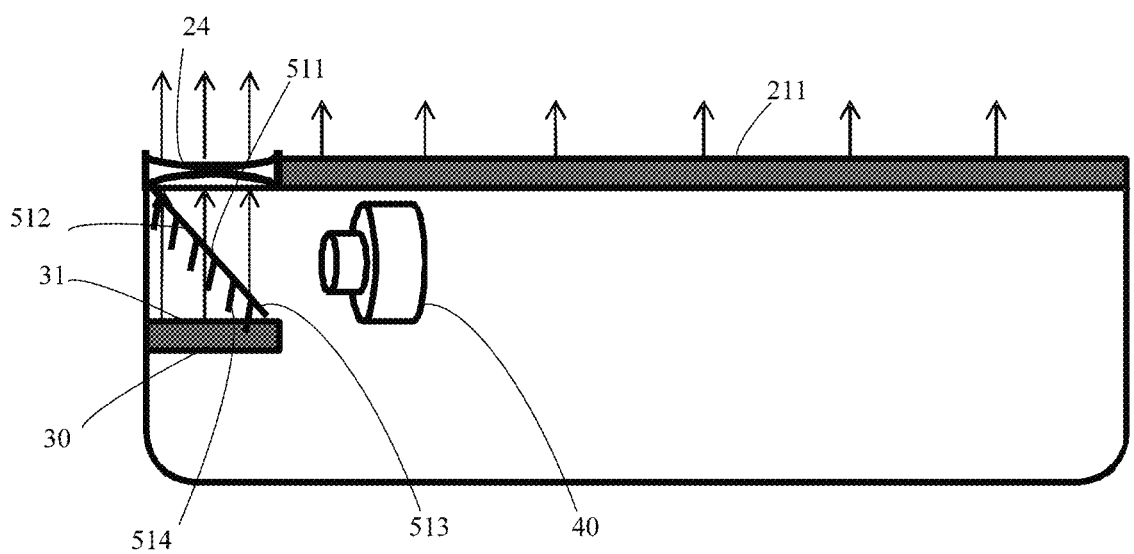
FIG. 2 is a schematic diagram showing the principle of realizing full screen display when the camera is turned off according to an embodiment of the present application.

An embodiment of the present disclosure provides a display device 100, which is capable of realizing full screen display. As shown in FIGS. 1 and 2, the display device 100 includes a body 10, a display screen 20 and a second display area 30. The display screen 20 is disposed on the body 10, and includes a first display area 21 and a light transmitting area 23, and the first display area 21 has a light exiting surface 211 facing away from the body 10. The second display area 30 is located between the display screen 20 and a bottom surface of the body 10.

The first display area 21 constitutes a display area of the display screen 20. The second display area 30 is configured to compensate for the light transmitting area 23 so that the light transmitting area 23 can display image information. As shown in FIG. 2, the second display area 30 has a compensation display area 31 parallel to the first display area 21 on the entire front surface close to the display screen 20, and the light transmitting area 23 is located in a light exiting path of the compensation display area 31. Meanwhile, the second display area 30 (compensation display area 31) and the light transmitting area 23 are aligned with each other, and projections of the second display area 30 (compensation display area 31) and the light transmitting area 23 on the display screen overlap with each other, thereby realizing full-screen display.

For a terminal device such as a mobile phone, the thickness thereof is a key focus indicator. Generally, it is necessary to make no available space in the thickness direction of the terminal device. In the present embodiment, the compensation display area 31 is disposed parallel to the first display area 21, so that the compensation display area 31 can be arranged along a length direction of the terminal device, and thus has an advantage of not occupying a space in the thickness direction of the terminal device as compared with the case of arranging in a direction crossing the length direction.

The display screen 20 is a screen for display in the display device 100. For the screen for display, only the light transmitting area 23 needs to be reserved, and other areas can be set as the first display area 21, so that the area of the screen for display is substantially equal to the area of an upper surface of the body 10, thereby providing a display device having a higher screen-to-body ratio.

In an embodiment, the display screen 20 and the second display area 30 are OLED (also known as Organic Light-Emitting Diode) display screens. The OLED display has the characteristics of self-illumination, and has the advantages of high brightness and good display effect.

In an embodiment, the first display area 21 of the display screen 20 is an OLED display screen.

In other embodiments, the display screen 20 and the second display area 30 may also be other types of display screens, such as a liquid crystal display screen, a plasma display screen, a CRT display screen, or a Micro-Led display screen.

In addition, the light transmitting area 23 allows light to pass through, so that light is collected by a light-receiving module 40 used in combination with the display screen 20. In embodiments of the present disclosure, the position of the light transmitting area 23 on the display screen 20 is not specifically limited. In an embodiment, the light transmitting area 23 is disposed adjacent an edge of the display screen 20 so as not to affect the display of the first display area 21.

In an embodiment, the display device 100 further includes a light-receiving module 40 and an optical path structure 50 disposed between the display screen 20 and the bottom surface of the body 10.

The second display area 30 has a first state as shown in FIG. 1 and a second state as shown in FIG. 2. The second display area 30 does not emit light under a first state, and the optical path structure 50 reflects the light incident from the light transmitting area 23 toward the light-receiving module 40, so that the light-receiving module 40 can work properly. The second display area 30 emits light under a second state, which passes through the optical path structure 50 to reach the light transmitting area 23, so that the image information on the second display area 30 is displayed on the light transmitting area 23, thereby realizing a full screen display mode. In addition, the second display area 30 switches the operating state according to the received control command, thereby determining whether it is necessary to switch to the full-screen display mode according to actual needs.

The light-receiving module 40 can be at least one of a component or a module having a light collecting requirement, such as a camera module, a light sensor, or the like.

The display device 100 provided in embodiments of the present disclosure may be a mobile phone, a computer, a television, or the like. In an embodiment, the body 10 may be a shell of a terminal device, such as a mobile phone, with the display screen 20 mounted on the body and forming the front of the mobile phone. In other embodiments, body 10 may be the shell of other terminal devices. For example, the body 10 may be a shell of the host of a tablet computer.

In an embodiment, the optical path structure 50 comprises a semi-reflective semi-transparent structure 51. As shown in FIG. 2, the semi-reflective semi-transparent structure 51 has a light reflecting surface 511 and a light transmitting surface 512 facing away from each other, with the light reflecting surface 511 facing the light transmitting area 23, and the light transmitting surface 512 facing away from the light transmitting area 23 and facing the second display area 30. In the present embodiment, by using only the semi-reflective semi-transparent structure 51, it is possible to realize reflection of the light incident from the light-transmitting area 23, and also to transmit the light emitted from the second display area 30, so that the entire optical path structure 50 is relatively simple.

In an embodiment, an angle between the semi-reflective semi-transparent structure 51 and the transmitted light from the light transmitting area 23 is 45 degrees.

Figure 3:
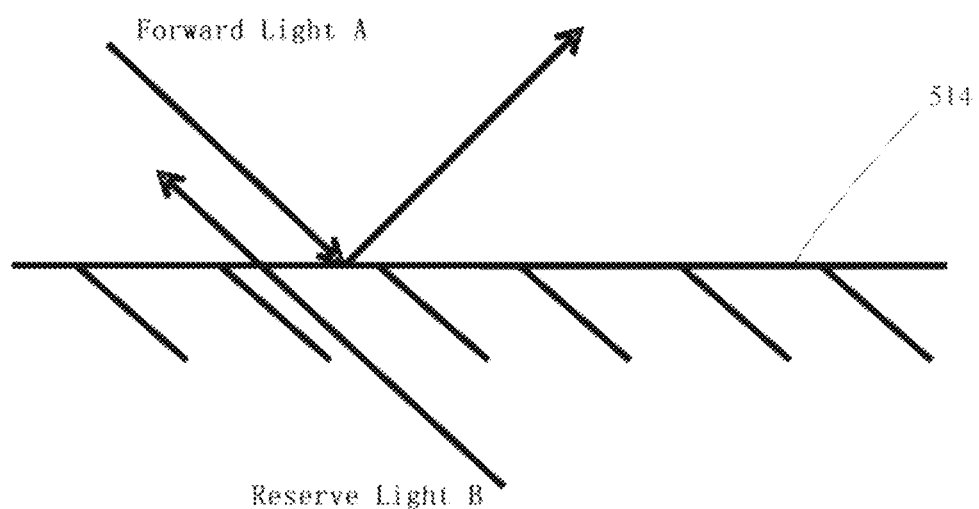
FIG. 3 is a schematic diagram showing the working principle of a semi-reflective semi-transparent film.

In an embodiment, the semi-reflective semi-transparent structure 51 includes a transparent substrate and a semi-reflective semi-transparent film 514 overlaying the surface of the transparent substrate. The operating principle of the semi-reflective semi-transparent film 514 will now be described with reference to FIG. 3. As shown in FIG. 3, when the semi-reflective semi-transparent film 514 covers the upper surface of the transparent substrate in FIG. 3, forward light A can only be reflected by the semi-reflective semi-transparent film 514, and cannot pass through the semi-reflective semi-transparent film 514, but reverse light B can pass through the semi-reflective semi-transparent film 514.

Therefore, when the semi-reflective semi-transparent film 514 is provided on a surface of the transparent substrate at a side, the surface of the transparent substrate at this side may form the light reflecting surface 511 that is opposite to the light transmitting area and a lens of the camera, and a surface of the transparent substrate at the other side forms the light transmitting surface 512 that allows light to pass through the transparent substrate.

The semi-reflective semi-transparent structure 51 can be obtained by coating the transparent substrate with the semi-reflective semi-transparent film 514. Thus, the semi-reflective semi-transparent structure 51 may has a simple structure, and can be easily obtained by coating a layer of film. Specifically, the transparent substrate can be made of transparent glass, which is convenient to get and process, needs no special manufacture, simplifies the preparation process, and facilitates to improve manufacturing efficiency.

In an embodiment, the projection of the light reflecting surface 511 on the display screen 20 covers the light transmitting area 23 and covers the projection of the second display area 30 (particularly the compensation display area 31) on the display screen 20. When the light is incident from the light transmitting area 23, the incident light may all illuminate on the light reflecting surface 511, which then reflects the light toward the light-receiving module 40, thereby ensuring the light collecting effect of the light-receiving module 40. In addition, in embodiments of the present disclosure, the angle of the light reflecting surface 511 is not specifically limited.

In an embodiment, the light-receiving module 40 is a camera, and the angle between the light reflecting surface 511 and the display screen 20 is 45 degrees. The lens axis X of the light-receiving module 40 and the second display area 30 are parallel to the display screen 20. The light reflecting surface 511 reflects the light incident in the direction perpendicular to the display screen 20 at a reflection angle of 90 degrees toward the light-receiving module 40, and the light from the second display area 30 toward the light transmitting surface 512 is also perpendicular to the display screen 20. Thus, in the case where the second display area 30 is in the second state, when the light passing through the semi-reflective semi-transparent structure 51 reaches the light transmitting area 23, the light is perpendicular to the display screen 20, so that the display manner of the light transmitting area 23 is consistent with that of the first display area 21, and the overall display effect of the full screen display is improved.

In an embodiment, by fixedly connecting the optical path structure 50 of the above embodiment to the display screen 20 and the second display area 30 respectively to form an integrated structure, the relative position between the display screen 20 and the optical path structure 50 is stable and reliable, which not only ensures the display accuracy of the light transmitting area 23 and the display effect of the full-screen display when the full-screen display is performed, but also facilitates to install the optical path structure 50 into the body 10.

In an embodiment, when the above-described semi-reflective semi-transparent structure 51 is adopted in the optical path structure 50, the following arrangement may be used: the display screen and the second display area are integrated by the semi-reflective semi-transparent structure 51, one end of the semi-reflective semi-transparent structure 51 is fixed to the display screen 20, and the other end is fixed to the second display area 30, so that the semi-reflective semi-transparent structure 51, the display screen 20 and the second display area 30 are formed into an integrated structure.

In an embodiment, the optical path structure 50 of the embodiment is coupled to the second display area 30, while one or both of the optical path structure 50 and the second display area 30 are coupled to the body 10, so that the relative position between the display screen 20 and the optical path structure 50 is stable and reliable.

In an embodiment, as shown in FIG. 1, the body 10 defines a receiving cavity 11. The optical path structure 50, the light-receiving module 40 and the second display area 30 are positioned in the receiving cavity 11 so as not to affect thickness and beauty of the terminal device.

In an embodiment, the light transmitting area 23 is a through hole, a light collecting lens 24 is configured within the through hole. Since the light collecting lens 24 is used, the light collecting effect of the light-receiving module 40 is improved, thereby ensuring the imaging effect of the light-receiving module 40.

In an embodiment, the second display area 30 is switchable between the operating states according to the activation or deactivation of the light-receiving module 40, so that the automatic switching of the full screen display mode is achieved according to the operation of the light-receiving module 40.

In an embodiment, when the light-receiving module 40 (for example, a camera) is activated, the second display area 30 does not emit light, that is, the second display area 30 is not used for display, and the optical path structure 50 reflects the light incident from the light transmitting area 23 toward the light extraction module 40. When the light-receiving module 40 is deactivated, the second display area 30 emits light, and the emitted light passes through the optical path structure 50 and reaches the light transmitting area 23, realizing compensation for the light-transmitting area 23, so that the light-transmitting area 23 displays image information, thereby realizing full-screen display, which in turn contributes to increasing the screen-to-body ratio of the display device 100.

Figure 4:
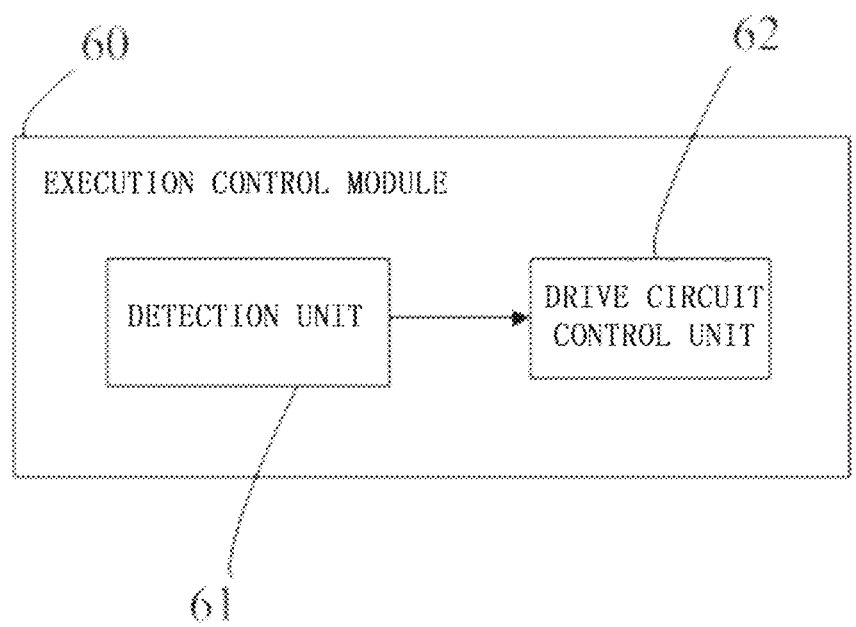
FIG. 4 is a structural schematic diagram of an execution control module according to an embodiment of the present disclosure.

In an embodiment, the second display area 30 is switchable between the operating states according to the activation or deactivation of the light-receiving module 40, so that the automatic switching of the full screen display mode is achieved according to the operation of the light-receiving module 40. As shown in FIG. 4, the display device 100 includes an execution control module 60. The execution control module 60 comprises a detection unit 61 and a drive circuit control unit 62. The detecting unit 61 is configured to detect in real time whether the light-receiving module 40 is activated, and the driving circuit control unit 62 is configured to control the second display area 30 in an operative state or in an inoperative state according to a driving signal of the light-receiving module 40. When the light-receiving module 40 is deactivated, the driving circuit control unit 62 controls the second display area 30 to emit light for display. When the light-receiving module 40 is activated, the drive circuit control unit 62 controls the second display area 30 to terminate the display. By setting the execution control module 60, the illumination of the second display area 30 and the compensation of the light transmissive area 23 may be realized when the light-receiving module 40 is deactivated, thereby realizing full screen display.

In an embodiment, when the light-receiving module 40 is activated, the driving circuit control unit 62 turns off the power supply to the second display area 30. When the light-receiving module 40 is deactivated, the drive circuit control unit 62 resumes power supply to the second display area 30.

In an embodiment, when the light-receiving module 40 is activated, the data line corresponding to the second display area 30 in a scan line is deactivated by the driving circuit control unit 62, so that the second display area 30 terminates displaying image information (e.g., an application) associated therewith. When the light-receiving module 40 is deactivated, the data line corresponding to the second display area 30 in the scan line is activated by the driving circuit control unit 62, so that the second display area 30 displays the image information associated therewith. The viewer can see the display image information when the second display area 30 displays image information associated therewith.

In addition, as shown in FIG. 1 and FIG. 2, the present disclosure also proposes a display screen module. The display screen module includes a display screen 20, a second display area 30, and a light-receiving module 40. The display screen 20 includes a first display area 21 and a light transmitting area 23, and the first display area 21 has a light exiting surface 211. The second display area 30 is located between the display screen 20 and a bottom surface of the body, and is capable of emitting light toward the first display area 21, and projections of the second display area 30 and the light transmitting area 23 on the display screen 20 overlap with each other. The light transmitting area 23 is located in a light exiting path of the second display area 30 such that the light transmitting area 23 can display image information displayed on the second display area 30. The light-receiving module 40 is located in the path of the reflected light from the light transmitting area 23.

The invention claimed is:

1. A display device, comprising:
 a body;
 a display screen disposed on the body and comprising a first display area and a light transmitting area;
 a second display area located between the display screen and a bottom surface of the body and aligned with the light transmitting area, projections of the second display area and the light transmitting area on the display screen overlapping with each other; and
 an optical path structure and a light-receiving module disposed between the display screen and the second display area;
 wherein:
 the second display area does not emit light under a first state;
 the optical path structure reflects the light incident from the light transmitting area toward the light-receiving module;
 light emitted from the second display area passes through the optical path structure to reach the light transmitting area under a second state; and the image information on the second display area is displayed on the light transmitting area.

2. The display device according to claim 1, wherein the optical path structure comprises a semi-reflective semi-transparent structure, and the semi-reflective semi-transparent structure reflects light transferred from the light transmissive area and allows light transferred from the second display area to pass therethrough.

3. The display device according to claim 2, wherein the semi-reflective semi-transparent structure comprises a transparent substrate and a semi-reflective semi-transparent film overlaying the surface of the transparent substrate.

4. The display device according to claim 3, wherein the semi-reflective semi-transparent structure is obtained by coating the transparent substrate with the semi-reflective semi-transparent film.

5. The display device according to claim 2, wherein an angle between the semi-reflective semi-transparent structure and transmitted light from the light transmitting area is 45 degrees.

6. The display device according to claim 2, wherein projection of a light reflecting surface of the semi-reflective semi-transparent structure which reflects light from the light transmitting area on the display screen covers the light transmitting area.

7. The display device according to claim 1, wherein the light-receiving module is a camera, and a lens axis of the light-receiving module and the second display area are parallel to the display screen.

8. The display device according to claim 1, wherein the optical path structure is integrated with the display screen and the second display area to form an integrated structure.

9. The display device according to claim 8, wherein the optical path structure comprises a semi-reflective semi-transparent structure having one end fixed to the display screen and the other end fixed to the second display area.

10. The display device according to claim 1, wherein the optical path structure is coupled to the second display area while one or both of the optical path structure and the second display area are coupled to the body.

11. The display device according to claim 1, wherein:
the body defines a receiving cavity, and
the optical path structure, the light-receiving module, and the second display area are positioned in the receiving cavity.

12. The display device according to claim 1, wherein the display screen and the second display area comprise OLED display screens.

13. The display device according to claim 1, wherein the light transmitting area comprises a through hole, a light collecting lens being configured within the through hole.

14. The display device according to claim 1, wherein the second display area is switchable between the first state and the second state according to the activation or deactivation of the light-receiving module.

15. The display device according to claim 14, wherein the second display area does not emit light and the optical path structure reflects the light incident from the light transmitting area toward the light extraction module when the light-receiving module is activated; and the second display emits light and the emitted light passes through the optical path structure and reaches the light transmitting area when the light-receiving module is deactivated.

16. A display screen module, comprising:
a body;
a display screen comprising a first display area and a light transmitting area;
a second display area located between the display screen and a bottom surface of the body and aligned with the light transmitting area, projections of the second display area and the light transmitting area on the display screen overlapping with each other; and
an optical path structure and a light-receiving module disposed between the display screen and the second display area;
wherein the optical path structure is configured to reflect the light incident from the light transmitting area toward the light-receiving module when the second display area does not emit light.

17. The display screen module according to claim 16, wherein:
the second display area is characterized by a first state and a second state, the first state is activated by a first control signal to cause the second display area not to emit light;
the second state is activated by a second control signal to allow the second display to emit light; and
the optical path structure is further configured to allow light emitted from the second display area pass through the optical path structure to reach the light transmitting area under the second state.

\* \* \* \* \*